(12) United States Patent
Milanesi et al.

(10) Patent No.: US 9,098,103 B1
(45) Date of Patent: Aug. 4, 2015

(54) CURRENT LIMIT CIRCUIT FOR DC-DC CONVERTER

(71) Applicant: Maxim Integrated Products, Inc., San Jose, CA (US)

(72) Inventors: Andrea Milanesi, Milan (IT); Salvatore Leone, Cantanzaro (IT)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 328 days.

(21) Appl. No.: 13/787,031

(22) Filed: Mar. 6, 2013

(51) Int. Cl.
*G05F 1/46* (2006.01)

(52) U.S. Cl.
CPC .......................................... *G05F 1/46* (2013.01)

(58) Field of Classification Search
CPC ............................... G05F 1/462; G05F 1/5735
USPC ................... 323/222, 282, 283, 284, 285, 908
See application file for complete search history.

(56) References Cited

U.S. PATENT DOCUMENTS

| 2010/0130017 | A1 | 5/2010 | Luo et al. | 438/710 |
| 2011/0136346 | A1 | 6/2011 | Geissbühler et al. | 438/710 |
| 2012/0024314 | A1 | 2/2012 | Luo et al. | 134/1.1 |
| 2013/0027012 | A1 * | 1/2013 | Huang | 323/283 |
| 2014/0225583 | A1 * | 8/2014 | Huang | 323/283 |
| 2014/0347026 | A1 * | 11/2014 | van Dijk | 323/282 |

* cited by examiner

*Primary Examiner* — Jeffrey Sterrett

(57) ABSTRACT

A clamp circuit generates a current limit for a DC-DC converter including an inductor. The clamp circuit includes a circuit to generate a control signal based on a sensed inductor current signal and a current limit signal for the DC-DC converter. A variable current source adjusts a first current signal based on the control signal. A transistor includes a control terminal, a first terminal and a second terminal. The variable current source outputs the first current signal to the control terminal of the transistor. The first terminal of the transistor outputs a clamp voltage signal.

15 Claims, 4 Drawing Sheets

100 lines# CURRENT LIMIT CIRCUIT FOR DC-DC CONVERTER

FIELD

The present disclosure relates to DC-DC converters, and more particularly to a current limiting circuit for DC-DC converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

DC-DC converters include a power switch, an inductor, and a diode that transfer energy from an input to an output. Constant frequency DC-DC converters usually set an output current limit by clamping a compensation regulation node to a fixed voltage. Due to the presence of a slope compensation circuit, the current limit will depend on the switching duty cycle or $V_{in}$ variation.

FIG. 1 shows DC-DC converter 10 that includes an error amplifier 20 including a non-inverting input receiving a reference voltage $V_{REF}$ and an inverting input receiving a feedback voltage $V_{FB}$. The error amplifier 20 outputs a compensation voltage $V_{COMP}$ to a non-inverting input of an error comparator 24, a resistor $R_{COMP}$ connected in series to a capacitor $C_{COMP}$, and a clamp circuit 30. The clamp circuit 30 includes a transistor T1 that receives a bias voltage $V_{bias}$.

An output of the error comparator 24 is input to a reset input of a flip-flop circuit 28. An output of the flip-flop circuit 28 drives a control terminal of a transistor 31. A first terminal of the transistor 31 is connected between an inductor $L_1$ and an anode of a diode $D_1$. An output of the DC-DC converter 10 is taken at the cathode of the diode D1. A resistive divider including first and second resistors R1 and R2 are connected to the cathode of the diode D1. A node between the resistors R1 and R2 provides the voltage feedback $V_{FB}$ to the error amplifier 20.

A second terminal of the transistor 31 is connected to a current sensor 34 that generates a sensed current $I_{Sense}$. A slope compensation circuit 38 generates a slope compensation current $I_{SL}$. A resistor $R_{SUM}$ is connected to an output of the current sensor 34, the slope compensation circuit 38, and an inverting input of the error comparator 24.

DC/DC converters that work with a constant frequency architecture and current mode use the slope compensation circuit 38 to add the slope current $I_{SL}$ to the sensed current $I_{Sense}$ to remove sub-harmonic instability in the inductor current $I_{L1}$. Usually the current limit is set by clamping the $V_{COMP}$ signal to a given value. The clamping voltage is set to: $V_{CLAMP}=V_{bias}+V_{be}$; hence $V_{COMP}$ will not exceed this value. The relationship between the inductor current $I_L$ and the sensed current $I_{sense}$ is $I_{sense}*R_{SUM}=I_L*R_{CS}$; where $R_{CS}$ the transresistance. $V_{COMP}=(I_{sense}+I_{SL})*R_{SUM}$. The maximum sensed current $I_{sense}$ will be $I_{sense\_max}=(V_{CLAMP}/R_{SUM})-I_{SL}$.

From the above relationships we can calculate the max inductor current: $I_{L\_MAX}=(1/R_{CS})*(V_{COMP}-I_{SL}*R_{SUM})$. $I_{SL}$ is a ramp; therefore the value that should be used in this formula is the slope current at the working duty cycle.

This approach generates a current limit that changes with the input voltage and the output voltage and therefore with the duty cycle as well. The current limit depends on the input and output voltage of the DC-DC converter 10. When the slope compensation signal is large, the current limit will vary and will depend on the duty cycle.

SUMMARY

This section provides a general summary of the disclosure, and is not a comprehensive disclosure of its full scope or all of its features.

A clamp circuit generates a current limit for a DC-DC converter including an inductor. The clamp circuit includes a circuit configured to generate a control signal based on a sensed inductor current signal and a current limit signal for the DC-DC converter. A variable current source is configured to adjust a first current signal based on the control signal. A transistor includes a control terminal, a first terminal and a second terminal. The variable current source outputs the first current signal to the control terminal of the transistor. The first terminal of the transistor outputs a clamp voltage signal.

In other features, a current source provides a second current signal to the control terminal of the transistor. A capacitor is connected to the control terminal of the transistor. The control signal generated by the circuit is independent of a slope compensation signal. The circuit comprises a comparator circuit to compare the sensed inductor current signal to the current limit signal.

A DC-DC converter includes an inductor including one terminal connected to an input voltage of the DC-DC converter. A diode includes an anode connected to another terminal of the inductor and a cathode supplying an output voltage of the DC-DC converter. A clamp circuit generates a clamp voltage signal. The clamp voltage signal is independent of the input voltage and the output voltage of the DC-DC converter. A first amplifier generates a voltage compensation signal based on a difference between a reference voltage signal and a voltage feedback signal. A first comparator compares a second signal and a voltage sum signal. The second signal is based on the voltage compensation signal and is limited by the clamp voltage signal. The voltage sum signal is based on a sensed inductor current signal and a slope compensation signal.

In other features, a resistive divider is connected to the cathode of the diode and configured to generate the feedback voltage. A flip-flop circuit includes an input connected to an output of the first comparator. A transistor includes a first terminal connected to the anode of the diode and a control terminal connected to an output of the flip-flop.

In other features, a circuit generates a control signal based on the sensed inductor current signal and a current limit signal for the DC-DC converter and independent from the slope compensation signal. A variable current source generates a first current signal based on the control signal. A transistor includes a control terminal, a first terminal and a second terminal. The variable current source outputs the first current signal to the control terminal of the transistor. The clamp voltage signal for the DC-DC converter is output by the first terminal of the transistor.

In other features, the circuit includes a second comparator circuit to generate the control signal by comparing the sensed inductor current signal to the current limit signal. A current source provides a second current signal to the control terminal of the transistor. A capacitor is connected to the first terminal of the transistor. A current sensor circuit generates the sensed inductor current signal.

In other features a slope compensation circuit generates the slope compensation signal.

In other features, a first resistor includes a first terminal receiving the slope compensation signal and the sensed inductor current signal. A second resistor includes a first terminal receiving the sensed inductor current signal and in communication with the second comparator. A voltage reference is in communication with second terminals of the first resistor and the second resistor.

In other features, the circuit includes a second comparator circuit to generate the control signal by comparing the sensed inductor current signal to the current limit signal. A current source provides a second current signal to the control terminal of the transistor.

In other features, a capacitor is connected to the first terminal of the transistor. A current sensor circuit is configured to generate the sensed inductor current signal. A slope compensation circuit is configured to generate the slope compensation signal. A first resistor includes a first terminal receiving the slope compensation signal and the sensed inductor current signal. A second resistor includes a first terminal receiving the sensed inductor current signal and in communication with the second comparator. A voltage reference is in communication with second terminals of the first resistor and the second resistor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to a control loop that dynamically controls a clamp voltage to obtain a constant output current that is relatively independent of the input voltage, the output voltages and the duty cycle. In other words, the present disclosure provides a constant current limit for DC-DC converters. Unlike conventional clamp circuits for DC-DC converters, the constant clamp is substantially independent of $V_{in}$, $V_{out}$ and the duty cycle.

Current limiting systems or methods should take into account the contribution of the slope compensation signal to avoid sub-harmonics and oscillation. As a result, the compensation signal $V_{COMP}$, which includes both inductor current and slope information, should be controlled. By clamping $V_{COMP}$ (at either an upper or lower level), the current can be limited (either positive or negative). The present disclosure generates a variable clamp voltage signal that adapts to variable slope or duty cycle conditions and maintains the current limit at a set value.

Figure 2:
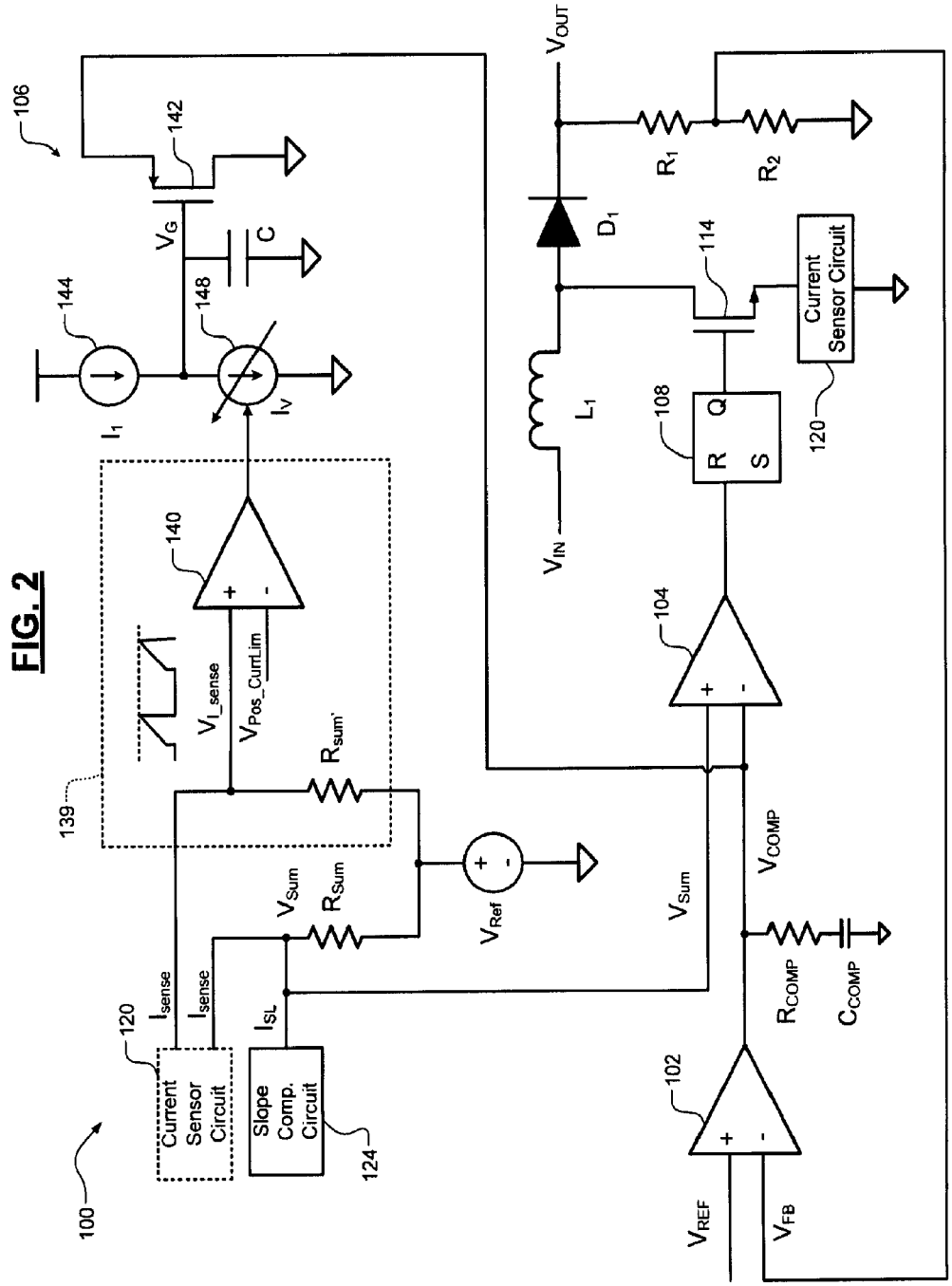
FIG. 2 is a functional block diagram of a DC-DC converter with a clamp circuit according to the present disclosure.

FIG. 2 shows a DC-DC converter 100 according to the present disclosure. The DC-DC converter 100 includes an error amplifier 102 that receives a reference voltage $V_{REF}$ and a feedback voltage $V_{FB}$. A compensation voltage $V_{COMP}$ is connected to an inverting input of an error comparator 104, a resistor $R_{COMP}$ connected in series to a capacitor $C_{COMP}$, and a clamp circuit 106. The clamp circuit 106 limits $V_{Comp}$ to the clamp voltage signal set by the clamp circuit 106.

An output of the error comparator 104 is input to a reset input of a flip-flop circuit 108. An output of the flip-flop circuit 108 drives a control terminal of a transistor 114. A first terminal of the transistor 114 is connected between an inductor $L_1$ and an anode of a diode $D_1$. An output of the DC-DC converter 100 is taken at the cathode of the diode D1. A resistive divider includes first and second resistors R1 and R2 that are connected to the cathode of the diode D1. A node between the resistors R1 and R2 is fed back to the error amplifier 102.

A second terminal of the transistor 114 is connected to a current sensor 120 that generates a sensed current $I_{sense}$. A slope compensation circuit 124 generates a slope compensation current $I_{SL}$. One terminal of a resistor $R_{SUM1}$ is connected to outputs of the current sensor 120 and the slope compensation circuit 124 ($V_{SUM}=R_{SUM1}*(I_{SL}+I_{sense})$).

The sensed current $I_{sense}$ is also output to a circuit 139 that determines when the sensed inductor current is greater than a current limit. The circuit 139 may be implemented in any suitable manner. For example only, the circuit 139 may include a comparator circuit 140 and a resistor $R_{SUM2}$. A sensed voltage $V_{sense}$ that is based on the sensed inductor current $I_{sense}$ is input to a non-inverting input of the comparator circuit 140. Another input of the comparator circuit 140 is connected to a positive current limit voltage $V_{PosCurrLim}$ that is based on a positive current limit threshold, which can be fixed or programmable. Other terminals of the resistors $R_{SUM1}$ and $R_{SUM2}$ are connected to a voltage reference $V_{REF}$.

The clamp circuit 106 further includes a transistor 142 having a first terminal connected to the inverting input of the error comparator 104. A control terminal of the transistor 142 is connected to a capacitor C, a current source 144 and a variable current source 148. An output of the comparator circuit 140 controls the variable current source 148.

Figure 3:
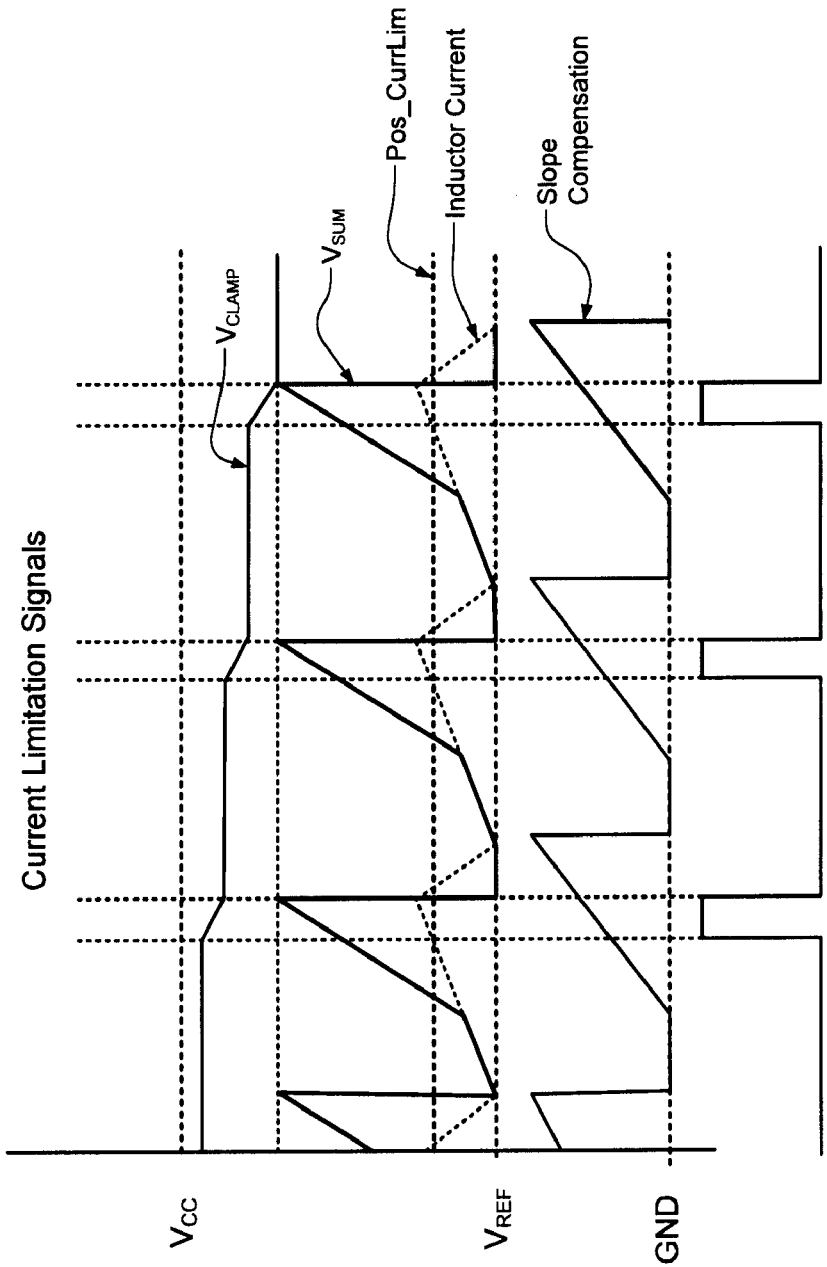
FIG. 3 illustrates current limitation signals according to the present disclosure.

FIG. 3 shows various current limitation signals including a clamp voltage $V_{CLAMP}$, a voltage sum signal $V_{SUM}$, an inductor current $I_{L1}$, and a slope compensation signal $V_{slope}$. For example only, the clamp voltage $V_{CLAMP}$ is $V_{CLAMP}=V_G+V_{TH}$, where $V_{TH}$ is threshold of the transistor 142. For example only, the transistor 142 may be a PMOS transistor. The comparator circuit 140 checks a duplicated $V_{SUM}$ branch without slope compensation. When the positive current limit threshold $V_{PosCurrLim}$ is exceeded, the loop that controls the clamp voltage on the compensation node starts driving the clamp to the correct value.

$V_{SUM}$ is the summing node voltage $((I_{sense}+I_{SL})*R_{SUM}$. The inductor current $I_L$ is sensed when current is rising in this example. Therefore $V_{SUM}=V_{REF}$ when inductor current is falling. There are no sub-harmonics because the current is limited using $V_{CLAMP}$. Therefore, the maximum swing of $V_{COMP}$ is limited, which preserves the information provided by the slope compensation signal.

The present disclosure also preserves the current limit when the slope compensation changes. This may be helpful when the slope compensation is programmable by the user. As can be appreciated, the same circuit can be used to limit either positive or negative current or both by combining two circuits.

Figure 1:
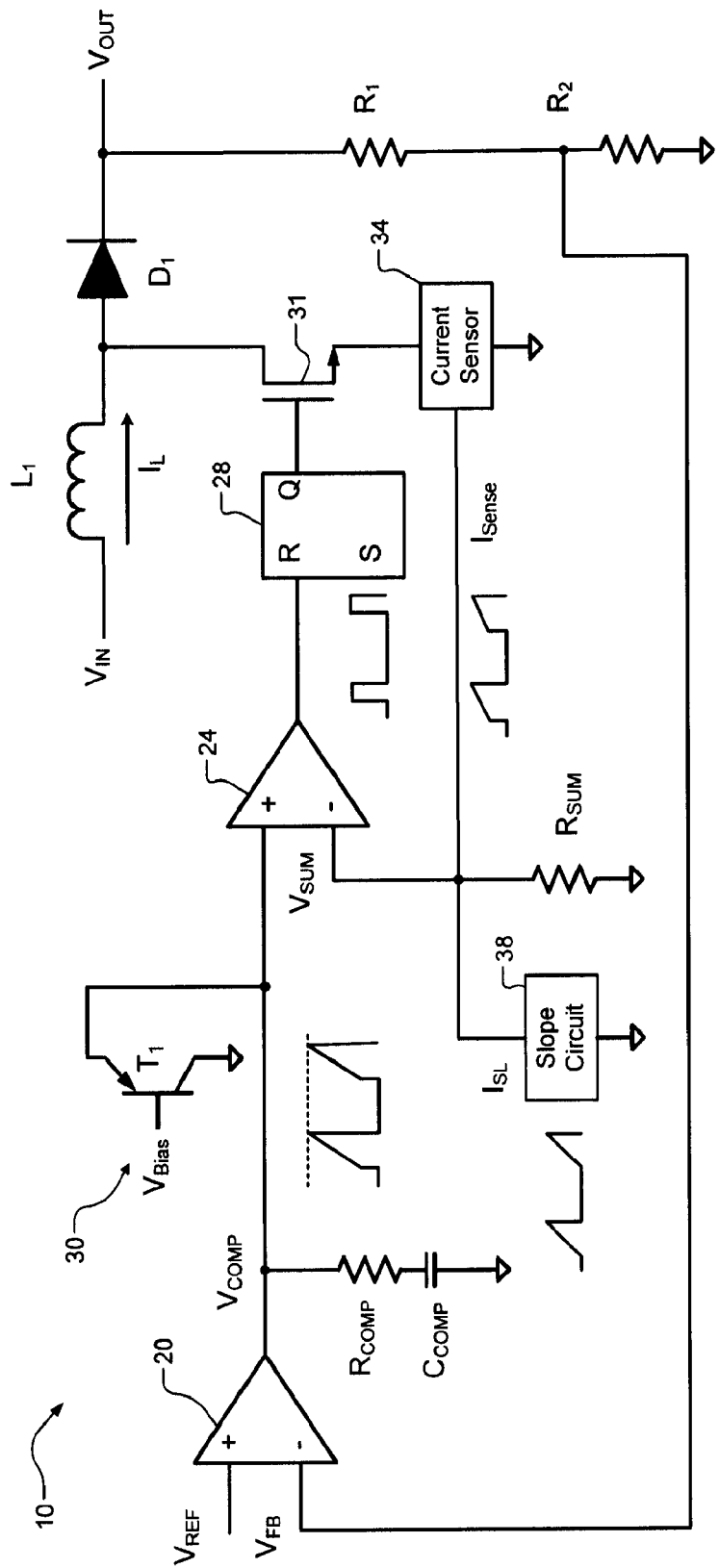
FIG. 1 is a functional block diagram of a DC-DC converter according to the prior art.
Figure 4:
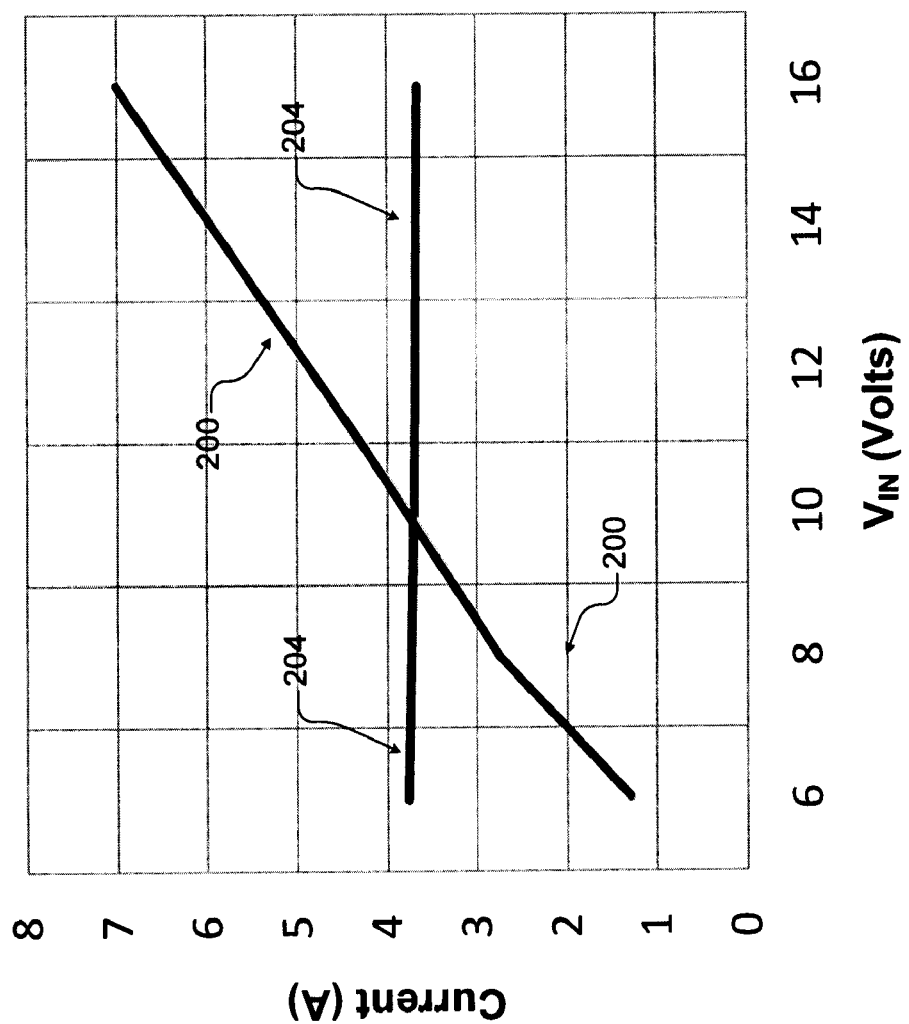
FIG. 4 is a graph illustrating the current limit as a function of voltage for the clamp circuits of FIG. 1 and FIG. 2.

FIG. 4 shows the current limit as a function of voltage for the clamp circuit of FIG. 1 identified at 200 and for the clamp circuit 106 of FIG. 2 identified at 204. As can be appreciated, the current limit of the clamp circuit 106 of FIG. 2 identified at 204 is relatively constant and is independent of the input and output voltages.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A clamp circuit to generate a current limit for a DC-DC converter including an inductor, comprising:
   a circuit to generate a control signal based on a sensed inductor current signal and a current limit signal for the DC-DC converter;
   a variable current source to adjust a first current signal based on the control signal; and
   a transistor including a control terminal, a first terminal and a second terminal,
   wherein the variable current source outputs the first current signal to the control terminal of the transistor, and
   wherein the first terminal of the transistor outputs a clamp voltage signal.

2. The clamp circuit of claim 1, further comprising a current source providing a second current signal to the control terminal of the transistor.

3. The clamp circuit of claim 1, further comprising a capacitor connected to the control terminal of the transistor.

4. The clamp circuit of claim 1, wherein the control signal generated by the circuit is independent of a slope compensation signal.

5. The clamp circuit of claim 1, wherein the circuit comprises a comparator circuit to compare the sensed inductor current signal to the current limit signal.

6. A DC-DC converter comprising:
   an inductor including one terminal connected to an input voltage of the DC-DC converter;
   a diode including an anode connected to another terminal of the inductor and a cathode supplying an output voltage of the DC-DC converter;
   a clamp circuit to generate a clamp voltage signal, wherein the clamp voltage signal is independent of the input voltage and the output voltage of the DC-DC converter;
   a first amplifier to generate a voltage compensation signal based on a difference between a reference voltage signal and a voltage feedback signal; and
   a first comparator to compare a second signal and a voltage sum signal,
   wherein the second signal is based on the voltage compensation signal and is limited by the clamp voltage signal,
   wherein the voltage sum signal is based on a sensed inductor current signal and a slope compensation signal.

7. The DC-DC converter of claim 6, further comprising:
   a resistive divider connected to the cathode of the diode and configured to generate the feedback voltage;
   a flip-flop circuit including an input connected to an output of the first comparator; and
   a transistor including a first terminal connected to the anode of the diode and a control terminal connected to an output of the flip-flop.

8. The DC-DC converter of claim 6, wherein the clamp circuit comprises:
   a circuit to generate a control signal based on the sensed inductor current signal and a current limit signal for the DC-DC converter and independent from the slope compensation signal;
   a variable current source to generate a first current signal based on the control signal; and
   a transistor including a control terminal, a first terminal and a second terminal,
   wherein the variable current source outputs the first current signal to the control terminal of the transistor, and
   wherein the clamp voltage signal for the DC-DC converter is output by the first terminal of the transistor.

9. The DC-DC converter of claim 8, wherein the circuit includes a second comparator circuit to generate the control signal by comparing the sensed inductor current signal to the current limit signal.

10. The DC-DC converter of claim 9, further comprising a current source providing a second current signal to the control terminal of the transistor.

11. The DC-DC converter of claim 9, further comprising a capacitor connected to the first terminal of the transistor.

12. The DC-DC converter of claim 9, further comprising a current sensor circuit to generate the sensed inductor current signal.

13. The DC-DC converter of claim 12, further comprising a slope compensation circuit to generate the slope compensation signal.

14. The DC-DC converter of claim 13, further comprising:
   a first resistor including a first terminal receiving the slope compensation signal and the sensed inductor current signal;
   a second resistor including a first terminal receiving the sensed inductor current signal and in communication with the second comparator; and
   a voltage reference in communication with second terminals of the first resistor and the second resistor.

15. The DC-DC converter of claim 6, wherein the second signal is equal to a lesser of the voltage compensation signal and the clamp voltage signal.

* * * * *

UNITED STATES PATENT AND TRADEMARK OFFICE
CERTIFICATE OF CORRECTION

PATENT NO. : 9,098,103 B1  
APPLICATION NO. : 13/787031  
DATED : August 4, 2015  
INVENTOR(S) : Andrea Milanesi Page 1 of 1

It is certified that error appears in the above-identified patent and that said Letters Patent is hereby corrected as shown below:

Title Page:  
Item (72) Inventors    Delete "Cantanzaro" and insert --Catanzaro--

In the Specification:  
Column 1, Line 33    Delete "T1" and insert --$T_1$--  
Column 1, Line 33    Delete "$V_{bias}$." and insert --$V_{Bias}$.--  
Column 1, Line 39    Delete "D1." and insert --$D_1$.--  
Column 1, Line 40    Delete "R1 and R2" and insert --$R_1$ and $R_2$--  
Column 1, Line 41    Delete "D1." and insert --$D_1$.--  
Column 1, Line 42    Delete "R1 and R2" and insert --$R_1$ and $R_2$--  
Column 1, Line 56    Delete "$V_{bias}$+" and insert --$V_{Bias}$+--  
Column 1, Line 58    Delete "$R_{cS}$" and insert --$R_{CS}$--  
Column 4, Line 5     Delete "$V_{Comp}$" and insert --$V_{COMP}$--  
Column 4, Line 12    Delete "D1." and insert --$D_1$.--  
Column 4, Line 13    Delete "R1 and R2" and insert --$R_1$ and $R_2$--  
Column 4, Line 14    Delete "D1." and insert --$D_1$.--  
Column 4, Line 15    Delete "R1 and R2" and insert --$R_1$ and $R_2$--

Signed and Sealed this  
Ninth Day of February, 2016

Michelle K. Lee  
*Director of the United States Patent and Trademark Office*